US012767096B2

(12) United States Patent
Butler

(10) Patent No.: US 12,767,096 B2
(45) Date of Patent: Oct. 20, 2026

(54) VEHICLE TYRE DETAILING MATS

(71) Applicant: Michael Butler, Guildford (GB)

(72) Inventor: Michael Butler, Guildford (GB)

( * ) Notice: Subject to any disclaimer, the term of this patent is extended or adjusted under 35 U.S.C. 154(b) by 287 days.

(21) Appl. No.: 18/691,808

(22) PCT Filed: May 11, 2022

(86) PCT No.: PCT/EP2022/062834
§ 371 (c)(1),
(2) Date: Mar. 13, 2024

(87) PCT Pub. No.: WO2023/041206
PCT Pub. Date: Mar. 23, 2023

(65) Prior Publication Data

US 2024/0343228 A1 Oct. 17, 2024

(30) Foreign Application Priority Data

Sep. 14, 2021 (GB) ..................................... 2113139

(51) Int. Cl.
*B60S 3/04* (2006.01)
*A47L 23/26* (2006.01)
(Continued)

(52) U.S. Cl.
CPC ............. *B60S 3/042* (2013.01); *A47L 23/266* (2013.01); *B60S 3/00* (2013.01); *B60T 3/00* (2013.01); *B66F 7/243* (2013.01)

(58) Field of Classification Search
CPC .......... B60S 3/042; B60S 3/00; A47L 23/266; B60T 3/00; B66F 7/243
(Continued)

(56) References Cited

U.S. PATENT DOCUMENTS 1,189,632 A * 7/1916 Sietz ....................... B66F 7/243
D12/608
2,022,804 A * 12/1935 Garey ..................... B25B 27/22
81/15.8
(Continued)

FOREIGN PATENT DOCUMENTS

AU 692747 B3 6/1998
DE 3818036 A1 * 12/1989 ................ B60S 3/00
(Continued)

OTHER PUBLICATIONS

International Preliminary Report on Patentability and Written Opinion issued in International Patent Application No. PCT/EP2022/062834 dated Mar. 5, 2024, in 7 pages.
(Continued)

*Primary Examiner* — Taylor Morris
(74) *Attorney, Agent, or Firm* — Knobbe, Martens, Olson & Bear, LLP

(57) ABSTRACT

A vehicle tyre detailing mat kit configured to form a vehicle tyre detailing mat assembly, the kit comprising a pair of first tyre detailing mats, each first tyre detailing mat comprising a mat base having a plurality of ridges formed on a surface of the base, the ridges forming channels or grooves which are directed towards a drainage aperture and a chock positioned on surface at one end of the planar base and a pair of second tyre detailing mats, each second tyre detailing mat comprising a mat base having two drainage apertures and having a plurality of ridges formed on a surface of the mat base, wherein the ridges form channels or grooves which are directed towards at least one of the two drainage apertures.

14 Claims, 8 Drawing Sheets

(51) Int. Cl.

| | |
|---|---|
| ***B60S 3/00*** | (2006.01) |
| ***B60T 3/00*** | (2006.01) |
| ***B66F 7/24*** | (2006.01) |

(58) Field of Classification Search

USPC .......................................................... 248/352

See application file for complete search history.

(56) References Cited

U.S. PATENT DOCUMENTS

| | | | | | |
|---|---|---|---|---|---|
| 2,532,149 | A * | 11/1950 | Cone | B60B 39/12 | 238/14 |
| 2,851,127 | A * | 9/1958 | Smith | B60T 3/00 | D12/217 |
| 3,557,909 | A * | 1/1971 | Neumann | B60T 3/00 | 188/32 |
| 3,640,459 | A * | 2/1972 | Preisler | B60B 39/12 | 238/14 |
| D242,136 | S * | 11/1976 | Matlock | D3/313 | |
| 4,246,982 | A * | 1/1981 | Pretnick | F16N 31/004 | 180/69.1 |
| 4,512,044 | A * | 4/1985 | Clark | A47K 3/002 | 4/581 |
| 5,020,638 | A * | 6/1991 | Smith | F16N 31/006 | 184/106 |
| D329,996 | S * | 10/1992 | Ciszewski | D12/604 | |
| 5,209,458 | A * | 5/1993 | Eubank | B66F 7/243 | 254/133 R |
| 5,427,209 | A * | 6/1995 | Tannehill | B60S 3/00 | 188/32 |
| 5,427,339 | A * | 6/1995 | Pauli | B65H 75/366 | 242/615 |
| 5,478,625 | A * | 12/1995 | Wright | F16N 31/006 | 180/69.1 |
| 5,556,692 | A * | 9/1996 | Zheng | E04H 6/428 | 428/137 |
| 5,894,618 | A * | 4/1999 | Jacobsen | A63C 19/10 | 254/88 |
| 6,120,876 | A * | 9/2000 | Walton | F16N 31/006 | 180/69.1 |
| 6,126,377 | A | 10/2000 | Cruse | | |
| 6,202,689 | B1 * | 3/2001 | Williams | A61M 1/84 | 137/561 R |
| 6,301,848 | B1 * | 10/2001 | Whitaker | B08B 17/00 | 52/302.1 |
| 6,394,362 | B1 * | 5/2002 | Kramr | B60B 39/12 | 238/14 |
| 6,439,543 | B1 * | 8/2002 | Peckham | B66F 7/243 | 33/391 |
| 6,561,201 | B1 * | 5/2003 | Midkiff | B60S 3/042 | 134/123 |
| 6,779,738 | B1 * | 8/2004 | Stannard | B60B 39/12 | 238/14 |
| D499,924 | S * | 12/2004 | Lee | D6/582 | |
| 6,910,675 | B1 * | 6/2005 | Cox | B66F 7/243 | 254/1 |
| 6,945,514 | B1 * | 9/2005 | Conwell | B66F 7/243 | 254/88 |
| 7,104,524 | B1 * | 9/2006 | Hidding | B66F 7/243 | 254/88 |
| 7,163,351 | B1 | 1/2007 | Shaver | | |
| 7,316,834 | B2 * | 1/2008 | Hernandez | E04H 6/428 | 428/44 |
| 7,401,441 | B2 * | 7/2008 | Zimmerle | E01C 11/229 | 52/177 |
| 7,559,113 | B1 | 7/2009 | DiCarlo, Jr. et al. | | |
| D598,833 | S * | 8/2009 | Welle | D12/203 | |
| 7,976,929 | B2 * | 7/2011 | MacLean | F16N 31/002 | 428/167 |
| 7,980,532 | B2 * | 7/2011 | Wickwire | B60T 3/00 | 254/88 |
| 8,002,241 | B1 * | 8/2011 | Shaw | B60P 3/36 | 254/5 C |
| 8,839,812 | B2 * | 9/2014 | Tanhehco | A61G 10/00 | 604/356 |
| 9,163,365 | B2 * | 10/2015 | Solis | E04F 11/17 | |
| 10,053,344 | B1 * | 8/2018 | Angel | B60P 3/36 | |
| 10,156,052 | B2 * | 12/2018 | Huber | E02D 31/002 | |
| 10,520,241 | B1 * | 12/2019 | Nelson | E01H 5/04 | |
| 10,625,976 | B2 * | 4/2020 | Forsythe | B65H 57/26 | |
| 2001/0050260 | A1 * | 12/2001 | Graham | B66F 7/243 | 211/23 |
| 2003/0146422 | A1 * | 8/2003 | Funk | B66F 7/243 | 254/88 |
| 2003/0148071 | A1 * | 8/2003 | Sneed | F16N 31/006 | 428/167 |
| 2005/0230393 | A1 * | 10/2005 | Testa | B08B 17/00 | 220/8 |
| 2006/0236487 | A1 * | 10/2006 | Dean | A47L 23/266 | 15/215 |
| 2008/0000250 | A1 * | 1/2008 | Cantolino | F24F 13/222 | 62/285 |
| 2009/0189130 | A1 * | 7/2009 | Heinz | B66F 7/243 | 254/88 |
| 2010/0252788 | A1 * | 10/2010 | Wickwire | B66F 7/243 | 254/88 |
| 2012/0012138 | A1 * | 1/2012 | Garrett | B08B 17/00 | 134/123 |
| 2014/0151161 | A1 * | 6/2014 | Cheng | B60T 3/00 | 188/32 |
| 2014/0325770 | A1 * | 11/2014 | Somers | B66F 7/243 | 14/69.5 |
| 2015/0307067 | A1 | 10/2015 | Movsesian | | |
| 2016/0242621 | A1 * | 8/2016 | Siegel | B32B 3/085 | |
| 2018/0368604 | A1 * | 12/2018 | Weih | H04L 63/10 | |
| 2019/0070901 | A1 * | 3/2019 | Otero | B60B 39/12 | |
| 2019/0246872 | A1 * | 8/2019 | Koenings | A47L 23/266 | |
| 2019/0314867 | A1 * | 10/2019 | Kauffman | B60S 3/042 | |
| 2020/0216043 | A1 * | 7/2020 | Hu | B60T 3/00 | |
| 2021/0394720 | A1 * | 12/2021 | Shahbazian | B60T 3/00 | |
| 2022/0176399 | A1 * | 6/2022 | Mercier | B05B 12/32 | |
| 2022/0332178 | A1 * | 10/2022 | Brown | B60R 11/00 | |
| 2023/0014284 | A1 * | 1/2023 | Bibbo | B60S 3/042 | |
| 2023/0119367 | A1 * | 4/2023 | Nakajima | A47L 23/266 | 15/104.92 |
| 2024/0174498 | A1 * | 5/2024 | Delanghe | B60T 3/00 | |

FOREIGN PATENT DOCUMENTS

| | | | | |
|---|---|---|---|---|
| EP | 0047222 | A1 * | 3/1982 | B60P 3/077 |
| EP | 1340710 | B1 * | 4/2008 | B66F 7/243 |
| EP | 2311696 | A1 * | 4/2011 | B60T 3/00 |
| EP | 2546101 | A1 * | 1/2013 | B60P 3/077 |
| GB | 2361752 | A * | 10/2001 | F16N 31/006 |
| GB | 2457882 | A * | 9/2009 | G01C 9/18 |
| GB | 2470045 | A | 11/2010 | |
| GB | 2592373 | A * | 9/2021 | B60S 3/042 |
| GB | 2595832 | A | 12/2021 | |
| GB | 2595832 | B | 6/2022 | |
| KR | 20190131880 | A * | 11/2019 | B60T 3/00 |
| WO | WO 2020/090130 | A1 | 5/2020 | |

OTHER PUBLICATIONS

International Search Report and Written Opinion issued in International Patent Application No. PCT/EP2022/062834 Sep. 8, 2022, in 9 pages.

Examination Report and Notification of Intention to Grant under Section 18(4) received in UK Patent Application No. GB2113139.6; mailed Mar. 11, 2022, in 2 pages.

Search Report issued in UK Patent Application No. GB2113139.6, mailed Sep. 28, 2021, in 2 pages.

* cited by examiner

PRIOR ART

TYRE FACING SURFACE
GROUND FACING SURFACE
Fold faces together
Fold faces together
48
32, 44
34
38a
38b
71
72
51

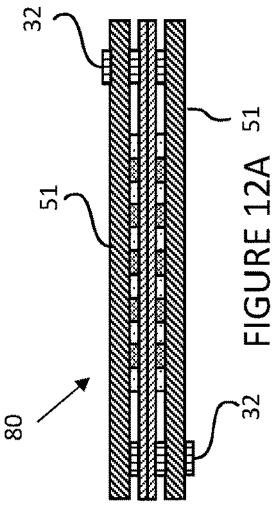
FIGURE 12A
FIGURE 12B
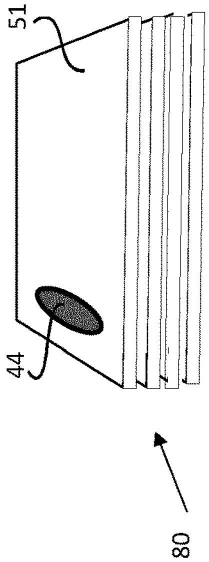
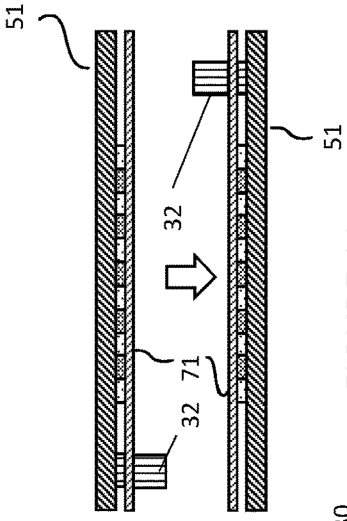
FIGURE 11
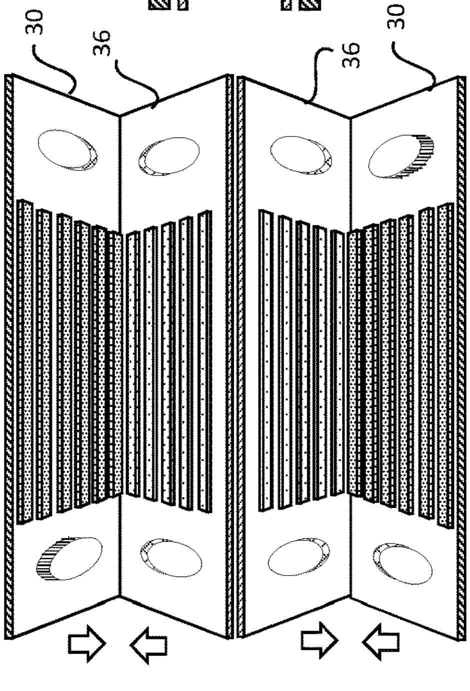
FIGURE 10

VEHICLE TYRE DETAILING MATS

The present invention relates to vehicle tyre detailing mats, to a vehicle tyre detailing mat kit for a vehicle tyre detailing mat assembly, and to a method of using the vehicle tyre detailing mats to detail clean a set of vehicle tyres and any related aspects.

BACKGROUND

When cleaning a vehicle on a ground surface, especially, for example, on a dirt or gravel or a similar loose material ground surface, it can be very difficult to properly perform a detailed clean of the vehicles tyres due to the proximity of the ground surface. This can be especially so if cleaning using a directional jet of water such as may be provided by a hose or pressure washer, as water and time are wasted if there is any splash back or spray of the clean water from the ground surface when cleaning the tyre at the point closest to the ground surface. Such splash back or spray is often contaminated with dirt or grit from the ground surface and when this dirty water is splashed back up onto the tyre and/or undercarriage of the vehicle it must then be removed, usually by respraying with the hose or pressure washer more carefully. This wastes water as it repeats the cleaning process and also if the surface-reflected spray or splash back contains any sand, grit or small stones these could also potentially damage part of the tyre or undercarriage of the vehicle. Accordingly, when trying to achieve a high-level clean, also referred to as detailing, a vehicle on a driveway or the like, a large amount of water can be wasted as each time the clean spray of water is reflected from the ground surface around the vehicle tyres.

FIG. 1 shows schematically an example of how cleaning or detailing front or rear tyres 12*a*, 12*b* when cleaning a vehicle 10 may cause water and time wastage through splashback off a ground surface 14. In FIG. 1, water, for example, from a hose, is directed as a jet (illustrated by arrows 18, 22 in FIG. 1) onto the base of the tyres 12*a*, 12*b* in the regions 16*a*, 16*b* where the tyres are directly in contact with the ground surface 14. When the jets 18, 22 hit the ground 14, dirty water is sprayed up to form splash-back up 20*a* to 20*e*. As shown, it is very difficult to ensure that there is no splash-back from either of the clean water jets 18, 20 in regions 16*a*, 16*b* which prolongs cleaning of the tyres 12*a*, 12*b* if splash-back 20*a*-20*e* occurs and contains dirt and/or debris from the ground surface 14.

The disclosed technology seeks to obviate or mitigate the problems known in the art to occur when performing a detailed clean, also known as detailing, vehicle tyres on a ground surface, such as, for example, tarmac, block paving, a compacted soil, or gravel surface or the like, or an inside surface which contains dirt and debris which can contaminate splash-back.

SUMMARY STATEMENTS

The disclosed technology relates to a tyre cleaning or detailing mat, which may also be referred to as a tyre valeting mat. The mat enables the base of a vehicle tyre to be cleaned better on ground surfaces which might otherwise provide a dirty splash back onto the tyres and vehicle when being cleaned outdoors on ground surfaces. Examples of ground surfaces may comprise compacted soil, grass, gravel, or block paving type driveways which may be embedded with loose sand or grit and the like. Such ground surfaces are commonly found in domestic residences rather than commercial cleaning venues. If such a ground surface is disturbed by a jet of water from a hose or the like, and a splash back may be created which contains dirt and other contaminants from the ground. This is particularly likely to happen when cleaning the part of a tyre and/or a tyre rim which is very close to the ground, for example, those parts of the tyre and/or tyre rim which are less than 10 cm or so from the ground, and especially when trying to clean parts which are only 5 cm or less, and even more so when cleaning parts which are 2 cm or less from the ground around the region of the tyre in contact with the ground.

Removal of water from the surface of the mat in a manner which reduces the likelihood of there being any inadvertent splash back may be provided using a configuration of ribs and drainage apertures, so that the vehicle sits on the ribs and the water is suitably channeled away. To facilitate carrying the mats and to allow for their storage in a compact manner, the mats are designed to be interlocked as a set of two mats for two wheeled vehicles or four mats for four wheeled vehicles. Each set of two mats can also be engaged with another set of two mats providing suitable engagement mechanism in used, which, in some embodiments, comprising passing a chock provided on one mat in each part through the aperture of another mat.

One aspect of the disclosed technology relates to a first tyre detailing mat comprising a mat base having a plurality of ridges formed on a surface of the base, the ridges forming channels or grooves which are directed towards a drainage aperture and a chock positioned on surface at one end of the base.

In some embodiments, the mat base is a planar mat base. An advantage of a substantially planar mat base is that it allow a group of two or more mats to fit closer/better together when they stacked on top of each other. However, in some embodiments, the mat bases may have a non-planar configuration which still allows the mats to be stacked either as a group of two which then stacks into another group of two or as a group of four, like the so called Russian Doll configuration, where one doll fits within another doll as they are stacked together, so that by analogy one mat stacks within another mat.

The first tyre mat may also be referred to herein as a front tyre mat. In practice, however, providing the vehicle is driven on to the mat in an appropriate manner, which may be a forward or reversing manner, the first and second tyres may be used interchangeably as either front or rear tyre mats. The terms first and front mat should accordingly be construed as terms used merely to distinguish the first or front mat configuration from the second or rear tyre mat configuration.

In some embodiments, in use, the mat base is placed on a ground surface and the plurality of ridges are configured to support a vehicle off the ground surface.

In some embodiments, the drainage aperture is located at an end of the planar base opposite to the chock and is configured to allow a chock having similar dimensions to chock to pass through it, and wherein the chock is dimensioned to pass through at least one other first tyre detailing mat, In some embodiments, a first tyre mat further comprises a chock support supporting the mat base and chock, In some embodiments, the chock support is a raised region or platform on the mat base on top of which the chock is provided.

In some embodiments, the chock support is a collar which surrounds chock on the mat base.

In some embodiments, the ridges arranged to run in a longitudinally on the mat base from the chock end of the mat base towards the drainage aperture.

In some embodiments, the grooves may be provided at right angles to the ridges.

A ridge may be a monolithic structure in some embodiments or an arrangement of protrusions in other embodiments.

In some embodiments, the ridges do not have uniform height. Each ridge may not have a uniform height, for example, one or more ridges may be formed by one or more rows of bobbles or another type of protuberance. The base of each row of bobbles or protuberances may be raised from the mat base surface to help with drainage guidance in some embodiments. By using ridges formed of protuberances, it may be possible to reduce the weight of the base mats and/or to use less material when molding each base mat yet still produce a base mat which sufficient strength and resilience to support a vehicle parked on top of the base mats.

In some embodiments, the tyre detailing mat comprises a resilient material or rubber mat.

In some embodiments, the tyre detailing mat is a moulded uni-body mat made from a resilient rubber material.

In some embodiments, the resilient rubber material comprises at least one of low-density polyethylene, LDPE, high-density polyethylene, HDPE.

In some embodiments, the mat bases are monolithically molded, for example, from a material like polypropylene.

In some embodiments, the underside of the mat base and/or the underside of the chock section of the mat base is at least partially hollow to reduce the amount of material used to mold the mat-bases. The hollow-area of the mat and/or under the chocks may be provided with supporting elements of molded material in the form of ridge-like support spines and/or support ribs in some embodiments to ensure that the weight of a parked vehicle can be supported and that the lateral forces generated as a vehicle is driven onto the mat are suitably handled so the mat base does not collapse or fold. The spines and/or ribs may be arranged at right-angles in a grid like fashion in some embodiments or form another configuration like a diamond lattice in other embodiments.

Advantageously, by providing structural support elements like spines and ribs within the mat base, less material is used when molding the mats than a solid mat would require and the weight of the mates is also reduced.

Another aspect of the disclosed technology relates to a second tyre detailing mat comprising a mat base having two drainage apertures and having a plurality of ridges formed on a surface of the mat base, wherein the ridges form channels or grooves which are directed towards at least one of the two drainage apertures and wherein, the ridges of the second tyre detailing mat are configured on surface so that surface, when placed in contact against ridges provided on a surface of a first tyre detailing mat according to the first aspect or any suitable one of its disclosed embodiments, accepts ridges to lie alongside ridges and one of the two apertures to be configured to aligned with an aperture of the first tyre detailing mat and the other one of the apertures to allow passage of a chock of the first tyre detailing mat through the mat base, Another aspect of the disclosed technology relates to a vehicle tyre detailing mat kit configured to form a vehicle tyre detailing mat assembly, the kit comprising a pair of first tyre detailing mats, each first tyre detailing mat comprising a mat base having a plurality of ridges formed on a surface of the base, the ridges forming channels or grooves which are directed towards a drainage aperture and a chock positioned on surface at one end of the planar base and a pair for second tyre detailing mats, each second tyre detailing mat comprising a mat base having two drainage apertures and having a plurality of ridges formed on a surface of the mat base, wherein the ridges form channels or grooves which are directed towards at least one of the two drainage apertures, and wherein, the ridges of the second tyre detailing mat are configured on the surface so that, when the surface of a second tyre detailing mat is placed in contact against the ridges provided on the surface of a first tyre detailing mat, the ridges of each mat lie alongside each other and wherein one of the two apertures of the second tyre detailing mat is configured to aligned with an aperture of the first tyre detailing mat and the other one of the apertures of the second tyre detailing mat allows passage of a chock of the first tyre detailing mat through the mat, wherein the first and second tyre detailing mats are configured to be assembled by passing in opposite directions each one of the chocks of each first tyre detailing mat through the apertures of the second tyre mats and the aperture of the other first tyre mat.

Another aspect of the disclosed technology relates to a vehicle tyre detailing mat kit configured to form a vehicle tyre detailing mat assembly, the kit comprising: a pair of first tyre detailing mats according to any of the disclosed embodiments of the first aspect; and a pair of second tyre detailing mats according to any of the disclosed embodiments of the second aspect, wherein the first and second tyre detailing mats are configured to be assembled together by passing in opposite directions each one of the chocks of each first tyre detailing mat through the apertures of the second tyre mats and the aperture of the other first tyre mat.

In some embodiments, the vehicle tyre detailing mat assembly comprises two pairs of first and second tyre detailing mats, each pair comprising a first and a second tyre detailing mat with the surfaces on which their respective ridges are provided facing each other, wherein the chocks of each pair are then passed through the aligned apertures of the other pair of first and second tyre detailing mats.

In some embodiments, the first and second tyres are formed from a resilient rubber material, and wherein the dimensions of the chocks and apertures through which the chocks of the first tyre detailing mats pass in the vehicle tyre detailing mat assembly are configured so that the chocks are laterally compressed within the apertures.

Another aspect of the disclosed technology relates to a method of detailing tyres on a vehicle using a vehicle tyre detailing kit according to the third aspect, the method comprising: placing a first tyre detailing mat according to the first aspect adjacent to a front tyre of the vehicle; placing a second tyre detailing mat according to the second aspect adjacent to each rear tyre of the vehicle; and moving the vehicle forwards or backwards onto the first tyre detailing mats until the front tyres are placed on the first tyre detailing mats adjacent the chocks of the first tyre detailing mats and the rear tyres of the vehicle are positioned on the second tyre detailing mats.

In some embodiments, the ridges may be formed by one or more protrusions from the mat base. In other words, in some embodiments, the ridges are solid rib-like structures, however, in some embodiments, the ridges are straight but in other embodiments they may have breaks or gaps between ridge elements.

In some embodiments, the tyre detailing mat may comprise a mat base having instead or in addition to having a plurality of ridges, a plurality of protrusions formed on a surface of the base, the protrusions being arranged to form on the surface of the mat base one or more channels or grooves which are directed towards at least one drainage aperture.

The protrusions may form or comprise ribs or ridges which are arranged in a configuration to guide a liquid, for example, water or water mixed with a cleaning solution, towards at least one of the at least one drainage apertures. The dimensions of the mat are suitably configured so that a vehicle tyre may be driven onto the mat and rest on the protrusions. Different sizes of mat and different materials may be used for different types of tyres and weights of vehicles.

Advantageously, by raising the vehicle off the ground onto the mat, it is possible to reduce the amount of splash back that can occur when cleaning the vehicle resting on a dirty, gritty or gravel ground surface. Water or a water cleaning solution mix from a hose, wand or pressure washer in such situations may result in water contaminated with dirt, grit, or gravel or other contaminants splashing back from the ground surface where the vehicle is located. By moving the vehicle onto a set of mats, one mat under each tyre of the vehicle, the vehicle tyres can be cleaned or valeted with great detail even the area at the base of the tyres where they would otherwise make ground contact. This means that the car cleaning may be more water efficient, which is good for the environment, as well as more time-efficient for the user who is detailing or valeting the vehicle. The vehicle may be a land-based vehicle such as a car, lorry or caravan, or a plane or trailer or anything where detailed cleaning of tyres is required.

The protrusions may be arranged on the surface of the mat base to form grooves or channels on the mat base and one or more additional grooves in the mat base may form channels which are open at one or more ends within at least one drainage aperture in the mat base are provided. A chock may be positioned on a surface at one end of the mat base, and an aperture is positioned at another end of the mat base, the aperture having dimensions configured to allow the same size and shape of chock provide on another mat to pass through the aperture when the chock provided on the mat base is passed through another mat-base having substantially the same dimensions. For example, in some embodiments, the tyre detailing mat may be one of a pair of tyre detailing mats which are configured as a pair so that the surface provided with the protrusions of either mat in the pair of mats, if pressed against the surface with the protrusions of the other mat in the pair of mats, will cause a chock of one mat to pass through at least one drainage aperture of the other mat. Each of the mats in the pair may a chock in some embodiments, whereas at least one the mats in the pair has a chock and the other mat also comprises at least two apertures, one through which the chock passes, the other aperture being configured to align with the aperture at the other end of the mat to that end of that mat having a chock.

Two or more mat pairs may be configured as a set of mats, wherein one mat of each pair has a chock that may pass through an aperture of the other mat in that pair which has two apertures through which a chock may pass. Once a chock has passed through one aperture in a pair of aligned mats, the apertures of both mats in that pair are aligned. By aligning two pairs of aligned mats, each pair of mats having protruding chock at one end and a pair of aligned apertures at another end, it is possible to pass the protruding chock of each mat pair through the aligned apertures of the other mat pair so that the protruding chocks each pass through the aligned apertures of three other mats. In some embodiments, the mats are formed from a resilient material, and the chocks and aligned apertures are dimensioned so that the apertures flex to allow the chocks to pass through and then engage with the surface of the chocks with a sufficient frictional force on the chocks to prevent them from disengaging. In this manner, the chocks and apertures form a fixing mechanism to hold a pair of mats or two pairs of (four) mats. Each pair comprises a mat configured with a chock and a mat configured with two chock-sized apertures so that when the chock of one mat in the pair passes through the aperture of the other mat, the aperture of the mat with the chock is aligned with the other aperture of the mat having no chock. In some embodiments the compressive force exerted by the chock when it has passed through the aperture of a mat creates sufficient friction to engage two mats in a pair together.

As also mentioned above, mat having a chock may be referred to herein as a front tyre mat, and a mat having at least two apertures of a size through which a chock of another tyre mat can pass through but not having a chock may be referred to herein as a rear tyre mat. The terms "front" and "rear" should merely be considered distinguishing labels, as the orientation of the mats in practice is up to a user and how they drive the car onto the mats, and whether they prefer to have chocks at the front or rear.

BRIEF DESCRIPTION OF THE DRAWINGS

Various example embodiments of the disclosed technology is described with reference to the accompanying drawings which are by way of example only and are not intended to be limiting. In the drawings:

FIG. 10 shows schematically how a set of tyre detailing mats are arranged for stacking into a tyre detailing mat assembly;

FIG. 11 shows schematically how two pairs of engaged first or second tyre detailing mats are moved together to be stacked into a tyre detailing mat assembly according to an embodiment of the disclosed technology;

FIG. 12A shows schematically the two pairs of first or second tyre detailing mats stacked together into a tyre detailing mat assembly according to an embodiment of the disclosed technology; and FIG. 12B shows a perspective view of the tyre detailing mat assembly of FIG. 12A.

DETAILED DESCRIPTION OF THE DRAWINGS

The following description of the drawings refer to example embodiments of the disclosed technology only. In the following description, various specific details are set forth in order to disclose various example embodiments of the invention. It will be apparent, however, to anyone skilled in the field of the invention that disclosed technology may be practiced without some or all of some of the specific structural or process details recited below in some embodiments of the invention. In some or all of the detailed examples of the disclosed technology, if the presence of features and process steps would be apparent to someone skilled in the field of the invention, such features and/or process steps may not be described in detail for the sake of clarity and conciseness. Reference numbers which refer to the same feature in different embodiments retain their numbering.

Figure 1:
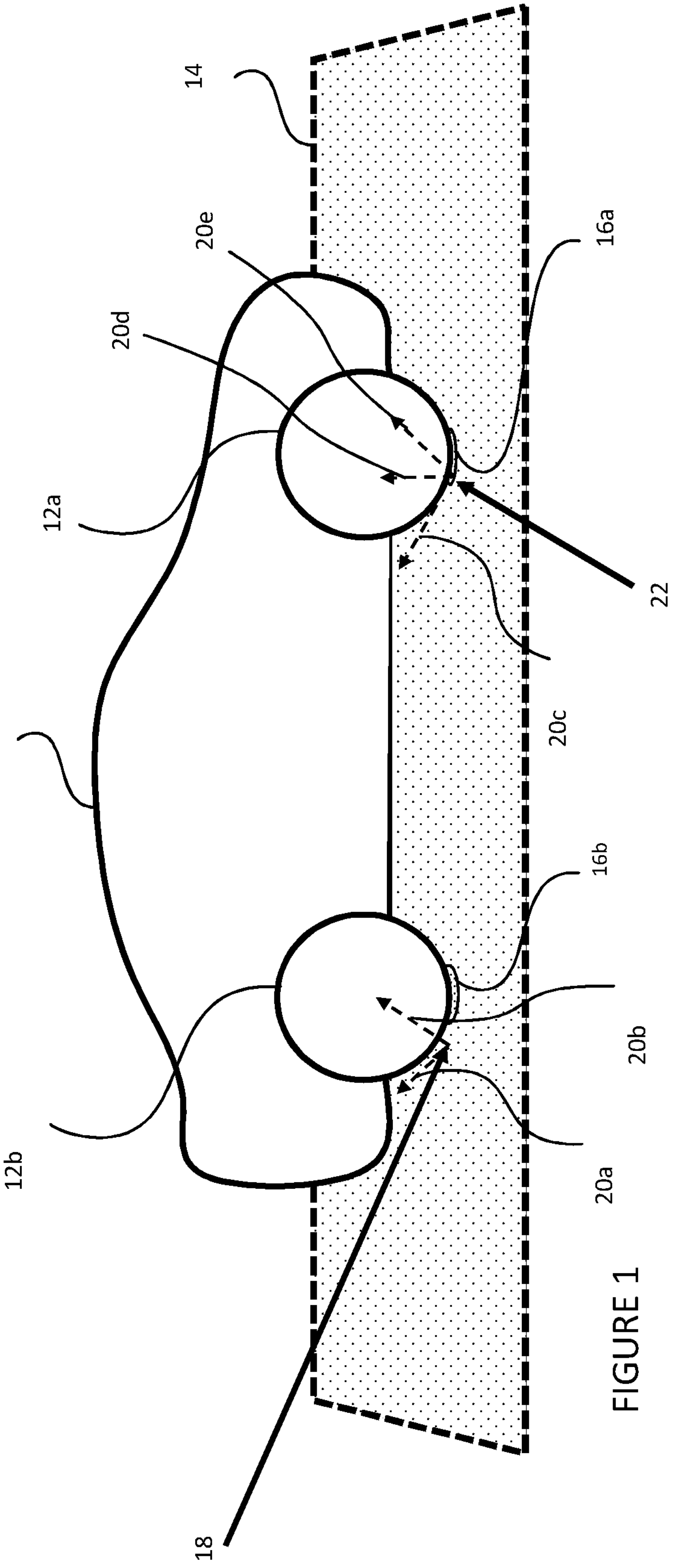
FIG. 1 shows schematically an example of how tyre-detailing when cleaning vehicles may cause water and time wastage through splash back off a ground surface.
Figure 2:
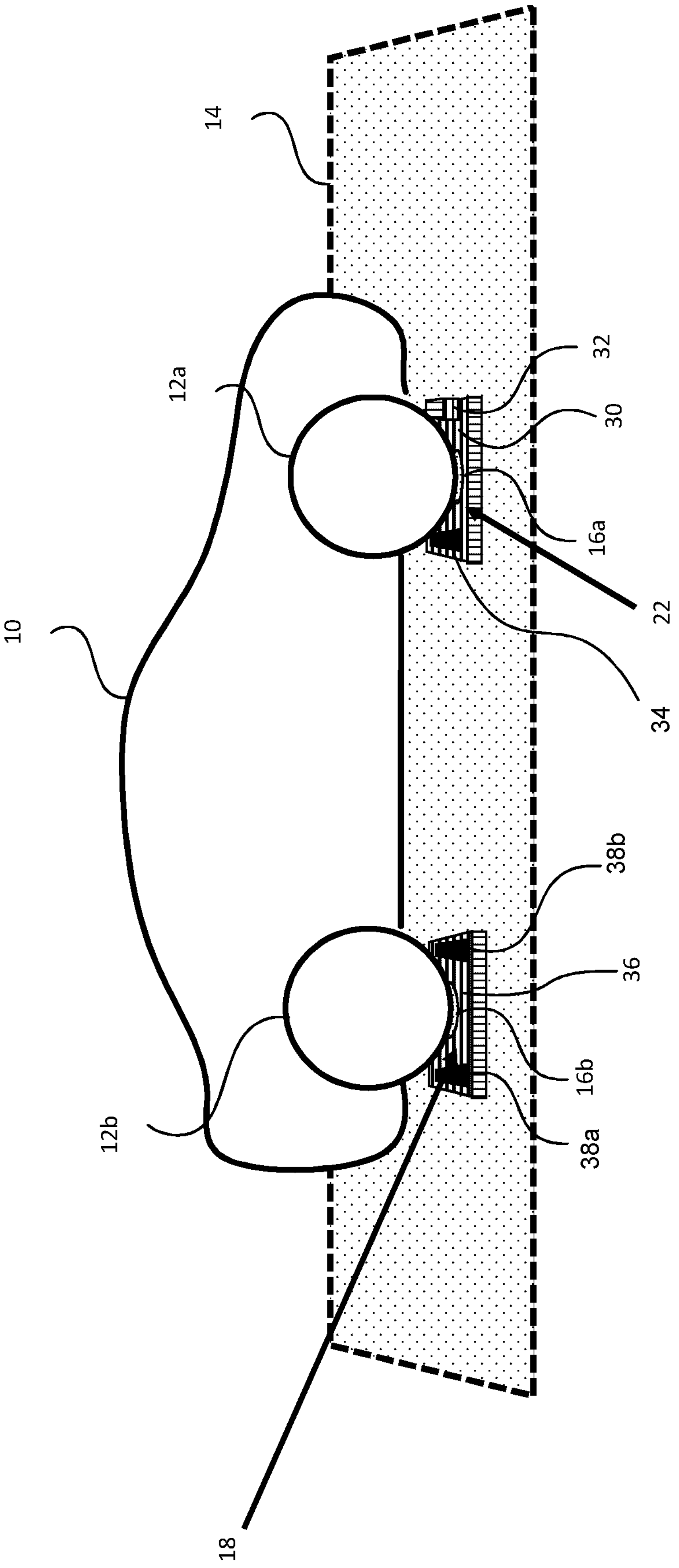
FIG. 2 shows schematically how vehicle tyre detailing mats according to an embodiment of the disclosed technology may reduce the amount of water and time taken to clean a vehicle.

FIG. 2 shows schematically how vehicle tyre detailing mats 30, 36 according to an embodiment of the disclosed technology may reduce the amount of water and time taken to clean a vehicle 10 when this is positioned on surface 14. In FIG. 2, a first, also referred to herein as a front, tyre detailing mat 30 is provided under a front tyre 12*a* of the vehicle 10 to raise the front tyre 12*a* off the ground surface 14 in the region 16*a* where the front tyre 12*a* would otherwise come into contact with the ground surface 14. Also shown in FIG. 2 is a second, or rear, tyre detailing mat 36. The second or rear tyre detailing mat 36 is provided under a rear tyre 12*b* to raise the rear tyre 12*b* off the ground surface 14 in the region 16*b* where the rear tyre 12*b* would otherwise come into contact with the ground surface 14.

Any references to front tyre detailing mats should also be interpreted as a reference to first tyre detailing mats which may, in some embodiments, refer the front tyre detailing mats being used as rear tyre detailing mats, unless the context clearly prevents this and vice versa.

To use the first and second tyre detailing mats 30, 36, they are placed adjacent the tyres 12*a*, 12*b* of a vehicle 10 so that by moving the vehicle either forwards or backwards the vehicle will move onto the first and second tyre detailing mats so that tyres 12*a*, 12*b* are raised off the ground 14. As FIG. 2 shows schematically a side view it will be appreciated that usually, although not necessarily, corresponding first and second tyre mats 30, 36 are provided for raising tyres 12*c*, 12*d* (not shown in the Figures) off the far side of the vehicle 10. The far side of the vehicle 10 is not visible in FIG. 2 but such far side first and second mats form part of a set of four vehicle tyre detailing mats for a four-wheel vehicle which can form an assembly 80 such as FIGS. 12A and 12B show (FIGS. 12A and 12B are described in more detail later below). In one embodiment, the mats are used by placing both of the first or front tyre detailing mats 30 on the ground in front of or to the rear of the front tyres 12*a*, 12*c* for example and both of the second or rear tyre detailing mats 36 in front of or rear wards of the rear tyres 12*b*, 12*d* of the vehicle and then slowly moving the vehicle 10 in a forwards or reverse direction until the tyres are on a tyre detailing mat. The first tyre detailing mats 30 are provided with a chock 32 at one end which will resist further movement off the first tyre detailing mat 30. This gives some feedback to a vehicle driver about when the vehicle is correctly positioned on the mats 30, 36.

In normal use it is expected that each of the first tyre detailing mats 30 will be positioned with their chocks 32 to prevent forwards movement of the front tyres 12*a*, however, it is also possible to provide the first tyre detailing mats 30 so that the chocks previous reverse movement of the vehicle and/or to provide the first tyre detailing mats 30 so they are positioned against the rear tyres 12*b*, for example, so that when the vehicle 10 is moved backwards (or forwards) onto the mats the rear tyres will abut the chocks 32 of the first tyre detailing mats 30.

From now on, references to front tyre detailing mat 30 should also be regarded as a reference to the first tyre detailing mat 30 and references to the rear tyre detailing mat 36 also as a reference to the second tyre detailing mat 36.

As shown in FIG. 2, the front tyre detailing mat 30 is provided with a chock 32 forwards of the vehicle tyre which sits on a number of ridges 40*a,b,c,d,e,f* (described in more detail later below) and an aperture 34 rearwards of the vehicle tyre. The rear tyre detailing mat 36 has no chock and comprises a number of ridges 62 (not labelled in FIG. 2) and has two apertures which are shown in FIG. 2 as an aperture 38*a* rearwards of the vehicle tyre 12*b* and an aperture 38*b* which is forwards of the vehicle tyre 12*b*. When water is directed in the form of a jet 18, or 22 towards the region where the car tyres 12*a*, 12*b* are on the car tyre detailing mats 30, 36, instead of causing splash-back from the ground surface, the jet water is channeled by the ridges on each vehicle tyre detailing mat 30, 36 towards the apertures 34, 38*a*, 38*b*, where it drains away without causing water to splash-back. This limits the area where splashback can occur and may completely eliminate it in some situations, as depending on the dimensions of the mats and the location of the apertures it may be very difficult to angle the clean water jets so that they pass through the apertures.

By limiting the amount of splash-back, there is less likelihood of dirty and/or otherwise contaminated splashback water reaching the vehicle's undercarriage and/or tyres and resulting in additional dirty or contaminants deposits which would then require removal either using the jets 18, 22 etc. or some other means of cleaning the deposits off. Accordingly, use of the vehicle tyre detailing mats may save water. It may also and potentially prevent or reduce damage in some scenarios, for example, when using a hose or pressure washer to clean vehicle tyres on a gravel driveway, gravel may be included in the splashback which, if it impinges on the vehicle could damage the surface finish of the vehicle tyres, tyre rims or alloys and/or the vehicle undercarriage.

Figures 3A, 3B, 3C, 3D, 3E:
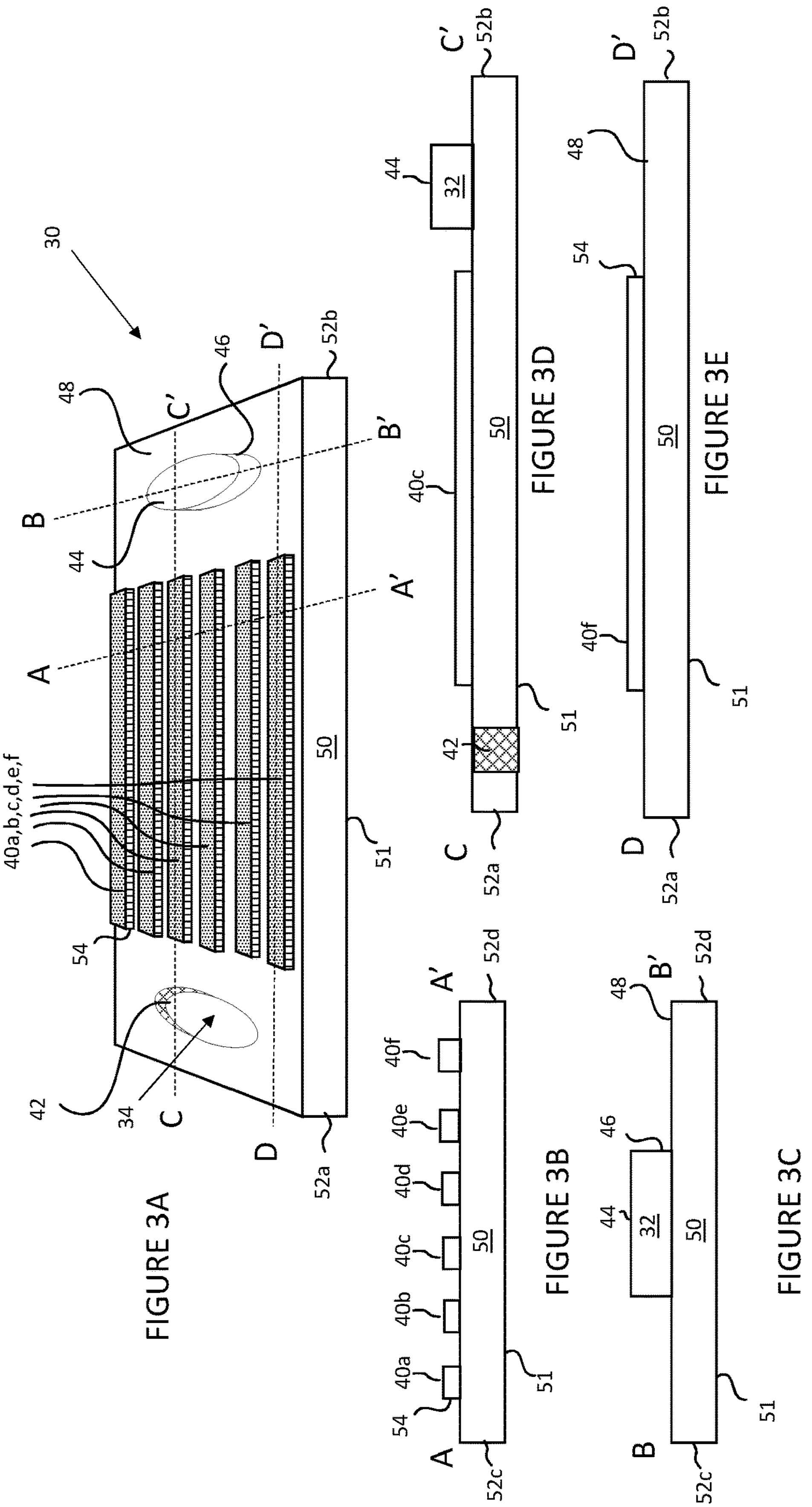
FIG. 3A shows schematically a perspective view of a first or front tyre detailing mat according to an embodiment of the disclosed technology.
FIG. 3B shows schematically a side cut-through the first or front tyre detailing mat of FIG. 3A and FIG. 4A along A-A'.
FIG. 3C shows schematically a side cut-through the front tyre detailing mat of FIG. 3A along B-B'.
FIG. 3D shows schematically a side cut-through the front tyre detailing mat of FIG. 3A along C-C'.
FIG. 3E shows schematically a side cut-through the front tyre detailing mat of FIG. 3A and FIG. 4A along D-D'.

FIG. 3A shows schematically a perspective view of a front tyre detailing mat 30 according to an embodiment of the disclosed technology. In FIG. 3A the front tyre detailing mat 30 comprises a base 50 having walls 52 (shown in FIG. 3A as walls 52*a*, 52*b*, and 52*c* with 52*d* being not visible) and a ground facing surface 51 and an opposite tyre facing surface, 48 when the mat 30 is in use. The front tyre detailing mat 30 comprises a chock 32, see FIG. 2, comprising side walls 46 and a surface 44. When positioning a vehicle on the tyre detailing mat 30, the vehicle tyre will be positioned so as to abut the chock 32 as a guide for the drive that the vehicle tyres are in the best position on the mat 30 for splashback to be reduced. In this manner the tyre detailing mat 30 functions as a tyre-positioning mat. Also provided on surface 48 are a plurality of ridges 40, on top of which the tyre will rest when the vehicle is in the detailing position on mat 30. As shown in FIG. 3A, six tyre raising ridges 40, labelled 40*a,b,c,d,e,f* in FIG. 3A, are raised off the surface 48 by the height of their sidewalls 54. At the distal end of mat 30 an aperture 34 having walls 42 functions as a drain for water when the mat is in use and positioned under a vehicle and a host jet 18, 22 is being used in the lower region 16*a* where the vehicle tyre would otherwise be positioned on the ground 14. The tyre raising ridges 40*a-f* are arranged in a longitudinal direction along the vehicle mats as shown in the embodiment illustrated schematically in FIGS. 3A to 3F. The tyre raising ridges 40*a-f* provide channels or grooves which as shown will direct some of the water from jet 18 when it impinges on the mat surface 48 or is reflected off the tyre 12*a* into the aperture 34 where it can flow away. This makes the mat 30 very useful when positioned on a water permeable surface such as a gravel driveway, as the gravel may allow the water which enters aperture 34 to drain away in a manner which further reduces any splashback.

FIG. 3B shows schematically a side cut-through the front tyre detailing mat 30 of FIG. 3A (and FIG. 4A see later below) along the line A-A' in FIG. 3A which shows the lateral profile of the tyre raising ridges 40*a*-40*f* in the arrangement shown in FIG. 3A. As shown, the tyre raising ridges 40*a*-40*f* may have substantially the same height and a regular width across base 50, however, in other embodiments of the disclosed technology such as those shown in FIGS. 9A to 9D illustrate schematically.

FIG. 3C shows schematically a side cut-through the front tyre detailing mat 30 of FIG. 3A along B-B'. As shown the chock 32 is mounted on the car detailing mat base 50. The height of the chock side walls 46 may be determined by the size, as in diameter of the vehicle tyre to be detailed using the mat 30. The thickness of the mat base 50, in other words, the height of the side walls 52*a,b,c,d* of the base 50 will be determined in part by the material of which the mat is constructed, as it needs to be structurally strong enough to support the compression exerted by the weight of the vehicle ridges 50 which will in turn compress mat base 50 and to hold the chuck against lateral movement exerted by a tyre 12*a*, 12*b* of the vehicle 10 when the vehicle is moved into position on the mat until it abuts the chock 32. The nature of the ground surface 14 on which the ground facing surface 51 of the mat base 50 sits may also affect the thickness of the base 50 and the material from which it is constructed.

A front tyre mat 30 may have a partially or wholly larger or thicker base 50, in other words, two or more of the base wall heights 52*a,b,c,d* may be larger than two or more wall height 71*a,b,c,d* of the base 70 of a rear tyre mat 30 in some embodiments. In embodiments where the front and rear tyre mats are to stack into each other in an engaging way, the base profile of the front and rear tyre mats must sufficiently be sufficiently reciprocal to support their engagement. This is described in more detail later below.

By having a thicker mat base in the area where the chock 32 is positioned on the base surface 48, the mat base 50 is less likely to be damaged or may deteriorate less quickly than if it is not thicker in that area as the chock 32 is butted by the tyre 12*a* being driven onto the mat. It may also increase the anchoring strength of the chock 32 in the base 50 in some embodiments where the chock 32 is formed integrally with a moulded mat base 50. In some embodiments, such as that shown in FIG. 3F and described later below, a support collar 60 may be provided on the front tyre base 50 in the region surrounding the chock 32 so as to support it. By only increasing the thickness of the mat 50 in the region of chock 32, the weight of the mat and the amount of material can be reduced compared to embodiments where the mat base thickness is increased in other regions.

In some embodiments, one of the walls of the front and/or rear tyre detailing mats 30, 36 is thicker than the opposite wall to that one of the walls. The wall may be an end wall, for example, in the front tyre mat, the side wall 52*b* at the end of the base 50 where the chock 32 is positioned may be higher in some embodiments than the opposite side wall 52*a* of the base. This may facilitate water flow into the rear aperture 34 of the front tyre mat 30. In some embodiments, one of the side walls which run parallel to the line of the car in use may be thicker than the other one of such side walls. For example, a side wall which would be positioned on the far side of the car for example, may be lower than the side wall on the off side of the car, to facilitate water flowing away from any incident clean water spray. Although the front tyre mat 30 shown in FIG. 3A has a substantially planar tyre facing surface 48, in some embodiments, the tyre facing surface 48 may be non-planar to assist the way the ridges 40*a-f* are provided on the surface 48 channel water into the apertures. For example, the base 50 may have side walls 52 which are thicker at the end with chock 32 and the surface may curve inwards and longitudinally towards the aperture 34 at the far end to channel water away from the tyre. In some embodiments, instead of or in addition to ridges 40*a-f*, grooves may be provided in surface 48 to provide channels which promote water flow into aperture 34.

FIG. 3D shows schematically a side cut-through the front tyre detailing mat 30 of FIG. 3A along C-C' which shows the side wall 42 of the aperture 34 at one end of the base 50 and the chock 32 located at the other end of the mat 30. Between the chock 32 and the aperture 34, a ridge 40*c* is shown. Ridge 40*c* may be mounted or integrally formed with the mat base 50 and is located on the tyre facing surface 48 of the base 50 which is opposite to the ground facing surface 52 of the base 50.

FIG. 3E shows schematically a side cut-through the front tyre detailing mat 30 of FIG. 3A (and FIG. 4A see later below) along D-D' in FIG. 3A, this shows how the ridge 40*f* is positioned on the tyre facing surface 48 of the mat 30 on the opposite side to the ground facing surface 52.

Figure 4A:
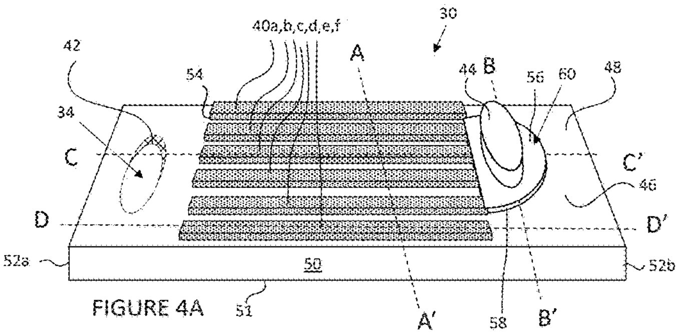
FIG. 4A shows schematically a perspective view of a first or front tyre detailing mat having a chock support platform or region according to another embodiment of the disclosed technology.

FIG. 4A shows schematically a perspective view of a front tyre detailing mat 30 according to another embodiment of the disclosed technology in which a chock support or collar 60 is provided on the front tyre base 50 in the region surrounding the chock 32 so as to support the chock 32 as a vehicle 10 is positioned on the mat 30 against the chock 32. Elements which are also shown in FIGS. 3A to 3E retain the numbering used in those Figures.

As shown in FIG. 4A, the chock support 60 is provided as an additional platform or area of thickness in the mat base 50 in the region surrounding the chock 32, with chock 32 resting on the platform or area of thickness. In some embodiments, however, the chock 32 may remain in contact with the mat base 50 and be surrounded by a chock support 60 in the form of a collar such as is shown in FIG. 4D, described later below.

Figure 4C:
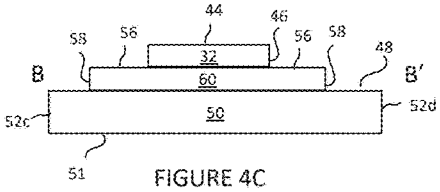
FIG. 4C shows schematically a side cut-through the front tyre detailing mat of FIG. 4A along B-B'.
Figure 4B:
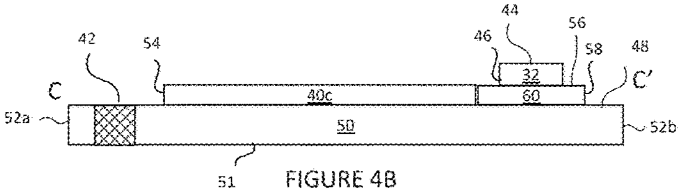
FIG. 4B shows schematically a side cut-through the front tyre detailing mat of FIG. 4A along C-C'.
Figure 4D:
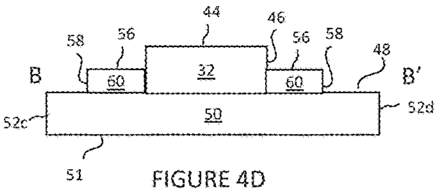
FIG. 4D shows schematically a side cut-through of an embodiment of a front tyre mat according to FIG. 4A having a chock support collar.

FIGS. 4B and 4C shows schematically a side cut-through the front tyre detailing mat of FIG. 4A along C-C' and along B-B' respectively. FIG. 4B which shows the chock 32 resting on the surface 54 of chock support platform 60 which in turn is located above surface 48 of the mat base 50. FIG. 4C shows schematically a side cut-through the front tyre detailing mat of FIG. 4A along B-B' where the chock support takes the form of a platform on or thickened region of mat base 50 which can be contrasted with the collar form of chock support 60 shown in FIG. 4D. FIG. 4D shows schematically a side cut-through of an embodiment of a front tyre mat according to FIG. 4A having a chock support 60 in the form of a collar which surrounds and supports the region of the chock where it contacts the mat base surface 48. In some embodiments, the chock support platform or collar is formed integrally, for example, it may be moulded, with the base mat 50 and chock 32.

Figures 5A, 5B, 5C, 5D:
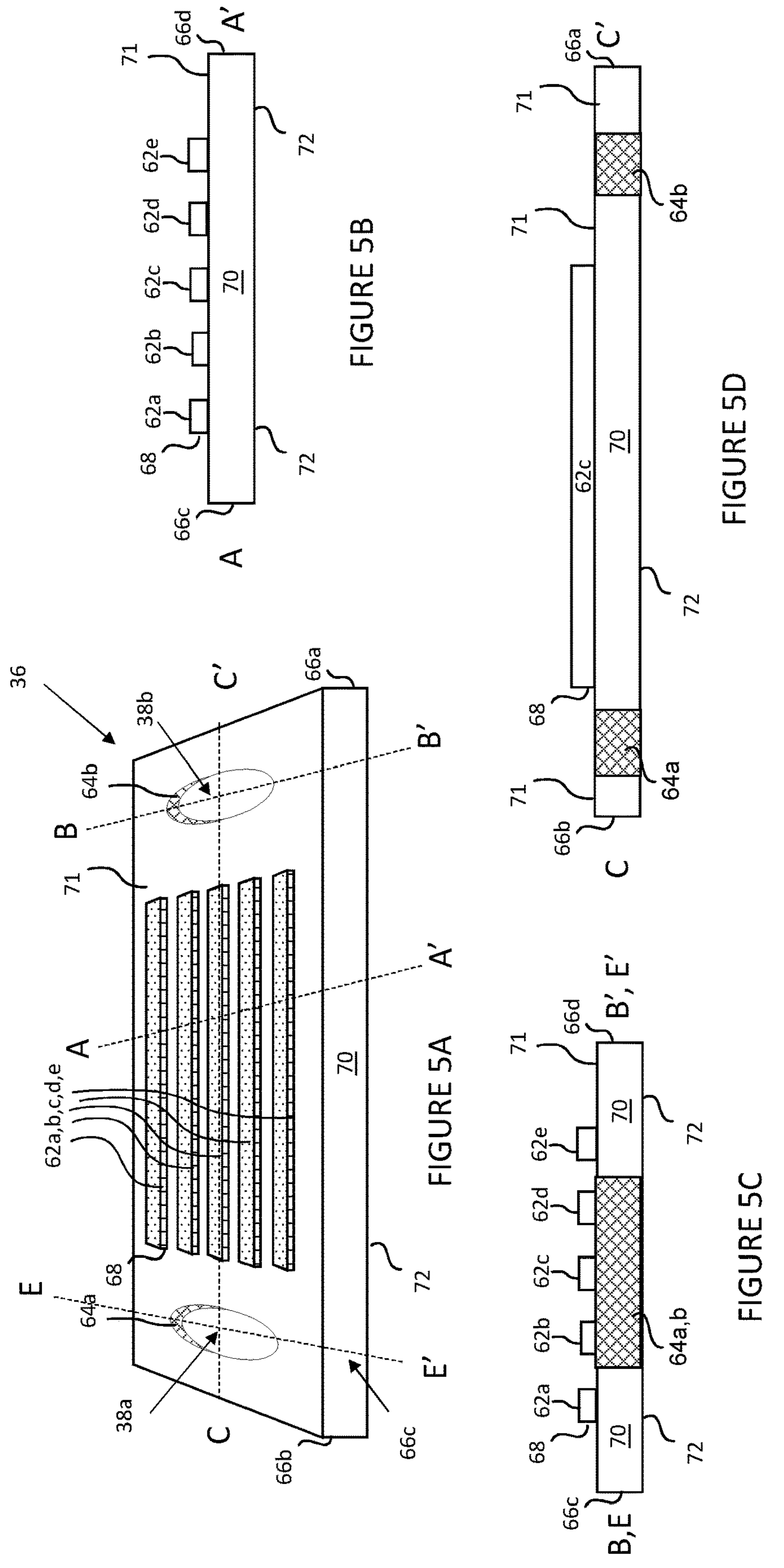
FIG. 5A shows schematically a perspective view of a second or rear tyre detailing mat according to an embodiment of the disclosed technology.
FIG. 5B shows schematically a side cut-through the rear tyre detailing mat of FIG. 5A along A-A'.
FIG. 5C shows schematically a side cut-through the rear tyre detailing mat of FIG. 5A along B-B'.
FIG. 5D shows schematically a side cut-through the rear tyre detailing mat of FIG. 5A along C-C'.

FIG. 5A shows schematically a perspective view of a rear tyre detailing mat 36 according to an embodiment of the disclosed technology. Rear tyre detailing mat 36 comprises similar features to the front tyre detailing mat 30 with a rear aperture 38*a* having side walls 64*a* but instead of chock 32 has an additional aperture 38*b* having side walls 64*b*. A number of ridges 62*a-e* are provided on one side of the mat base 30 which is the tyre facing surface 71 of the rear tyre mat base 70 in use of the mat. Tyre facing surface 71 opposite to the ground facing surface 70 of the rear tyre mat 36. The dimensions of each rear tyre detailing mat 36, and the positions and dimensions of ridges 62*a-e* and the apertures 38*a,b* on the tyre facing surface 71 are determined to reciprocate with the dimensions of the front tyre mat and the dimensions and positions of ridges 40*a-f*, chock 32 and rear aperture 34 of the front tyre mat 30 so that a front tyre mat 30 and rear tyre mat 36 can be positioned with their tyre facing surfaces 48 and 71 facing each other and then stacked with another pair of a front tyre mat 30 and rear tyre mat 36 also positioned with their tyre facing surfaces 48 and 71 facing each other. The protruding chocks 32 are positioned so that they each pass through the aligned apertures 34, 38 of the other pair of engaged front and rear tyre mats 30, 36, as is shown schematically in FIGS. 10, 11, 12A and 12B which are described more detail later below.

FIG. 5B shows schematically a side cut-through the rear tyre detailing mat of FIG. 5A along A-A'. As shown in FIG. 5B, all of the ridges 62*a-e* have the same height and cross-sectional profile, however, in other embodiments the ridges may have different heights and cross-sectional profiles, see FIGS. 9A to 9B for example.

FIG. 5C shows schematically a side cut-through the rear tyre detailing mat of FIG. 5A along either of the lines shown as B-B' or E-E' in FIG. 5B. In FIG. 5B the mat is symmetrical so that the cut-through along either B-B' or E-E' reveals the same features, namely the location of aperture 64*a* (along line E-E') or aperture 60*b* (along line B-B'). The position of the apertures 64*a*, 64*b* however is determined by the location of the chock 32 and aperture 38 of the front rear mat 30, for example, as shown in FIGS. 3A and 4A, so that a chock 32 can be passed through either one of apertures 64*a*, 64*b* of a rear tyre mat 36 so as to align the rear aperture 38 of that front tyre mat 36 with the other one of the apertures 64*a*. 64*b* of that rear tyre mat 36. The aligned front and rear mat pair are then able to be stacked with another pair of front and rear tyre mats by passing the chocks 32 which protrude through one of apertures 64*a, b* of each pair of aligned mats 30, 36 through the aligned apertures 38, 64*a* or 64*b* of the other pair of aligned mats 30, 36 (see FIGS. 10 and 11 for example). This is achieved by rotating each pair of mats by 180 degrees so that the chocks of each mat protrude at different ends of each mat pair.

FIG. 5D shows schematically a side cut-through the rear tyre detailing mat of FIG. 5A along C-C' which shows how apertures which provide drainage are provided at each end of the rear tyre detailing mats.

In some embodiments, more ridges 40*a-f* are provided on the front tyre detailing mat 30 than the number of ridges 62*a-e* provided on rear tyre detailing mat 36. In some embodiments one or both of the front or rear tyre detailing mats 30, 36 may be provided with grooves instead or in addition to ridges 40*a-f* or 62*a-e*.

As mentioned above, the dimensions of the front and rear tyre detailing mats are determined at least in part by the tyre dimensions to be cleaned and may also be modified based on the expected characteristics of the ground surface on which they are to be used in some embodiments. Finer grittier ground may become more easily incorporated into splash back and so a thicker base and thicker ridge height may be used.

Typical dimensions for the front and rear tyre detailing mats may also be determined relative to the tyres they are to clean. For example, in some embodiments, the mat length is determined relative to the diameter of the side tyres in some embodiments. For example, the front and rear mats 30, 36 may have a mat length L (along line C-C' or D-D') which is at least approximately the same length as the diameter of the tyres in some embodiments. The width W of the mats (i.e. the distance along a cut line A-A', B-B', or E-E') may be at least 1.5 times and is preferably 2 times the tyre thickness to twice or more as the tyres are thick. It will be appreciated that the front and rear tyre detailing overall mat shapes need not be rectangular as shown in the embodiments of FIGS. 3A to 5D. In some embodiments the front and rear mats may have reciprocal shapes which are a squares, ovals or circles which can be stacked by suitably positioning the apertures 34, 38*a*, 38*b* and chock 32 on the mats, for example, as shown in FIGS. 8A to 8E or 9A to 9D. In some embodiments, the mats may take the form of a parallelogram, in which case they may align along the edges 52*a*, 52*b* and 66*a*, 66*b* may not fully align along edges 52*c*, 52*d* and 66*c* and 66*d* which could then form "wings" when two pairs of mats are stacked, depending on the configuration of the chocks 32 and corresponding apertures in the parallelogram.

In a particular embodiment, the front tyre mat 30 has the following dimensions:

a. Base 50 width: cm/inches 28 cm/11.02"

b. Base 50 length: 50 cm/19.68"

c. Base 50 thickness/sidewall 52 height: 0.8 cm/0.31"

d. Ridge 40 length: 30 cm/11.81"

e. Ridge height 54:0.9 cm/0.35"

f.[1] Chock 32 length: 4 cm/1.57" Chock 32 height from base of mat 50: 0.4 cm/0.15"

g. Chock 32 width: 15 cm/5.90"

h. Chock side wall 58 height: 0.9 cm/0.35"

i. Aperture 34 width: 4.8 cm/1.88"

j. Aperture 34 sidewall 42 height: 0.8 cm/0.31"

The corresponding embodiment of the rear tyre mat 36 has the following dimensions:

a. Base 70 width: 28 cm/11.02"

b. Base 70 length: 50 cm/19.68"

c. Base 70 thickness/sidewall 52 height: 0.8 cm/0.31"

d. Ridge 62 length: 30 cm/11.81"

e. Ridge height 68: 0.0 cm/0.35"

f. Aperture 38*a* width: 4.9 cm/1.88"

g. Aperture 38*a* sidewall 64*a* height: 0.8 cm/0.31"

h. Aperture 38*b* width: 4.8 cm/1.88"

i. Aperture 38*b* sidewall 64*a* height: 0.8 cm/0.31"

j. Aperture 38*b* length: 15.8 cm/6.22" ALL APERTURES LENGTH 15.8 cm/6.22"

However, as will be apparent, these are examples of possible dimensions only and should not be considered limiting to any of the embodiments of the disclosed technology. The above example mat dimensions suit a range of tyre sizes, for example tyres from 16 to 23 inches in diameter and from 5 to 11 inches wide. Mats of these dimensions allow for a range of tyre sizes to be efficiently cleaned. As mentioned above, however, these are example dimensions and may be adjusted in some embodiments depending on tyre size, width and/or if a higher water pressure is to be used to limit or prevent splash back. As long as the contact patch of the tyre sits within the middle of the ribs or ridges arranged on the mat surfaces there should be no danger of any overspray reaching the ground.

In some example embodiments of the mat, the listed dimensions of the above mat sizes may be adjusted proportionately based on the tyres size exceeding the mid-range of the above dimensions.

Figures 6A, 6B, 6C, 6D, 7A, 7B, 7C, 7D:
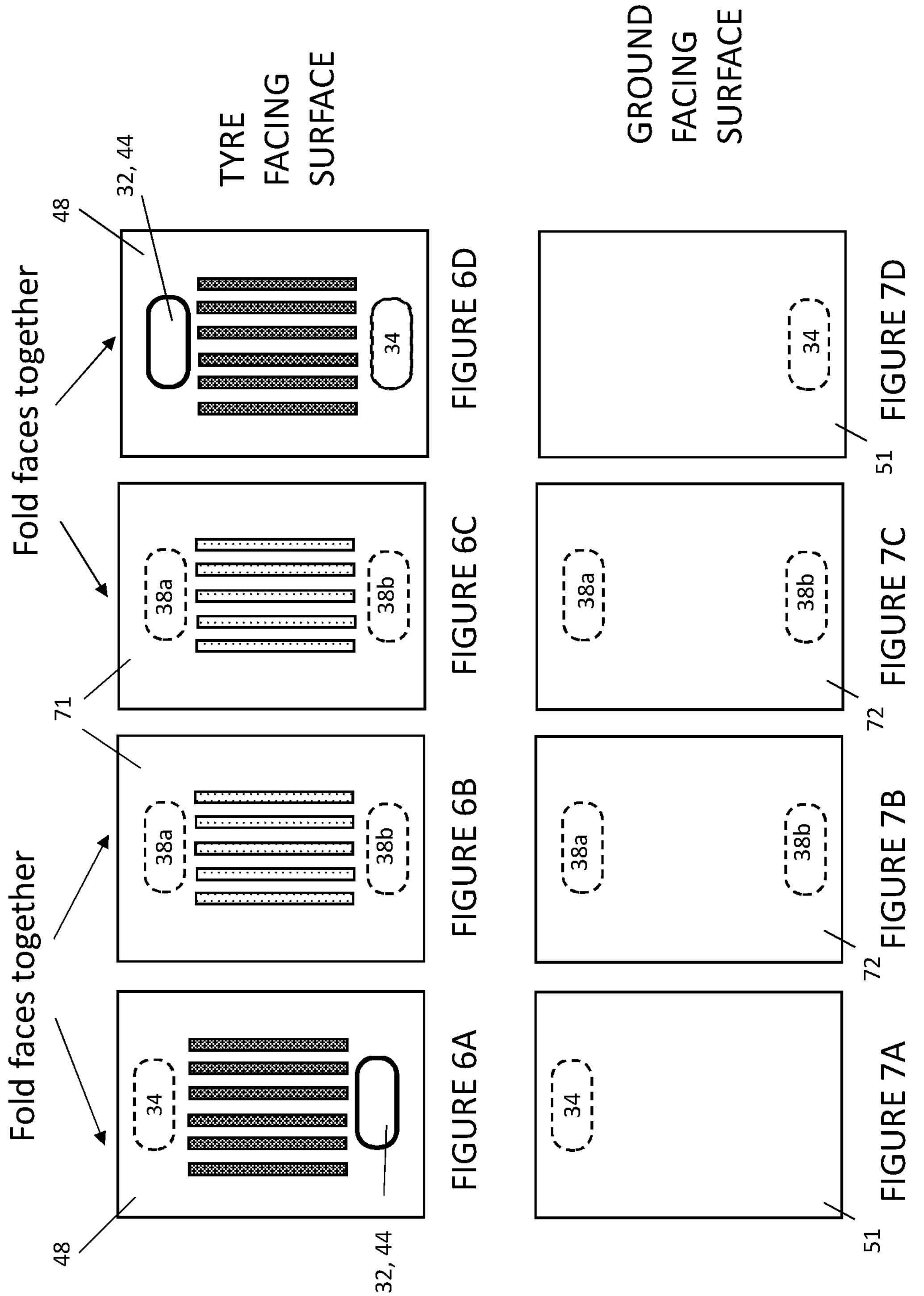
FIGS. 6A to 6D show plan views of the tyre facing surfaces of a set of tyre detailing mats according to an embodiment of the disclosed technology.
FIGS. 7A to 7D show plan views of the ground facing surfaces of the set of tyre detailing mats shown in FIGS. 6A to 6D.

FIGS. 6A to 6D show schematically plan views of the tyre facing surfaces of a set of two pairs of front and rear tyre detailing mats 30, 36 according to an embodiment of the disclosed technology. As shown, the front tyre detailing mat 30 of FIG. 6A is shown oriented so that its chock 32 could be engaged through the aperture 38*b* of the rear mat 36 shown in FIG. 6B. The front tyre detailing mat 30 of FIG. 6D is shown oriented 180 relative to the front tyre detailing mat 30 of FIG. 6A so that its chock 32 could be engaged through the aperture 38*a* of the rear mat 36 shown in FIG. 6C.

FIGS. 7A to 7D show plan views of the ground facing surfaces 51, 72 of the set of two pairs of front and rear tyre detailing mats shown in FIGS. 6A to 6D, which show the location of apertures 34, 38*a*, 38*b* in the rear (as in ground facing in use of the mats) surfaces 51, 72 of the respective front and rear mat bases 50, 70.

Figures 8A, 8B, 8C, 8D, 8E, 9A, 9B, 9C, 9D:
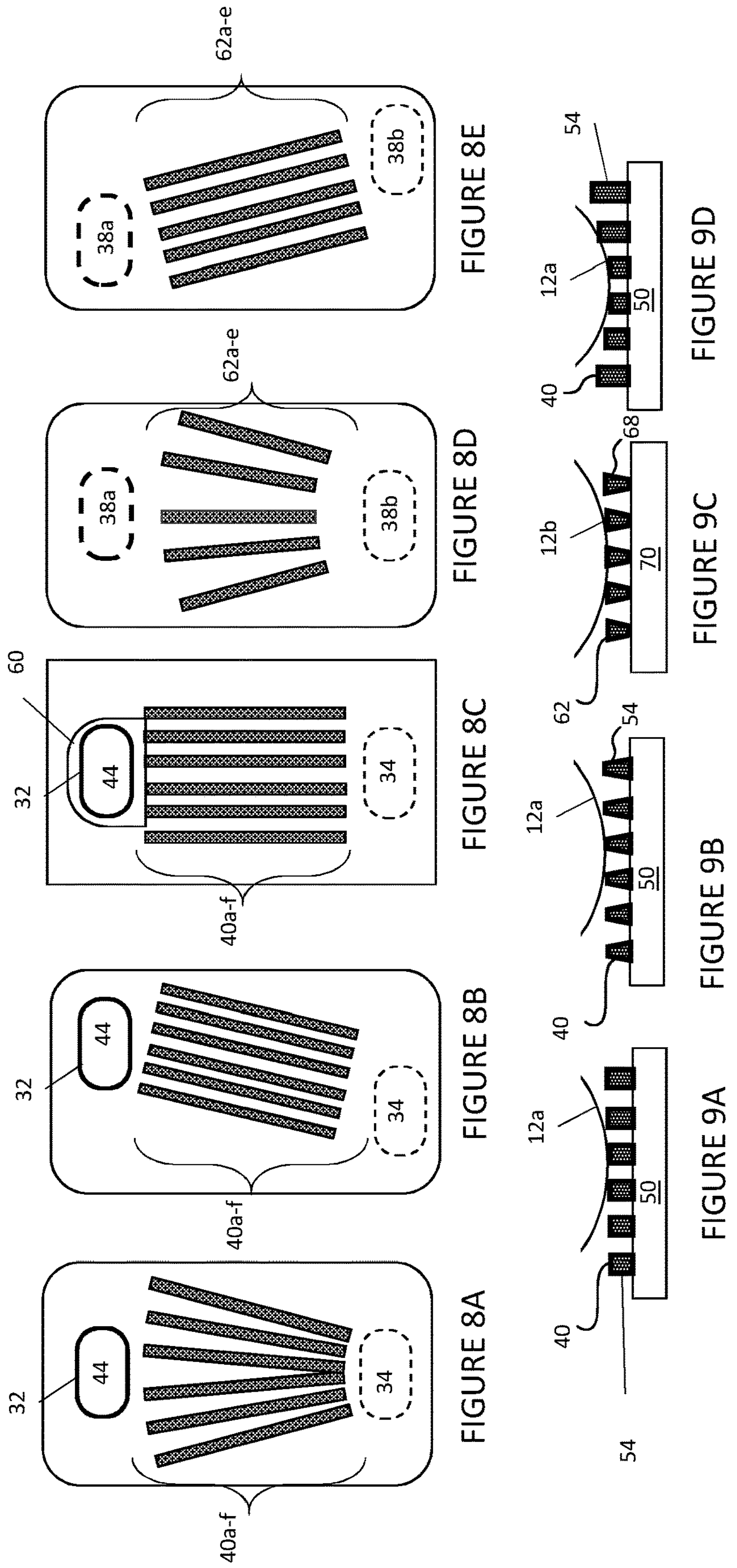
FIGS. 8A to 8C show examples of arrangements of ridges on first or front tyre detailing mat embodiments according to the disclosed technology.
FIGS. 8D and 8E show examples of arrangements of ridges on second or rear tyre detailing mat embodiments according to the disclosed technology.
FIGS. 9A to 9D show examples of cross-sections of ridges which are provided in various embodiments of first or second tyre detailing mats according to the disclosed technology.

FIGS. 8A to 8C show examples of various embodiments of front arrangements of ridges on front tyre detailing mat embodiments according to the disclosed technology and FIGS. 8D and 8E show examples of arrangements of ridges on rear tyre detailing mat embodiments according to the disclosed technology. In FIG. 8A, the front mat 30 has ridges 40*a-f* splayed at the chock end, and in FIG. 8D the ridges 62*a-e* on rear mat 36 are splayed in a reciprocal manner so that its tyre facing surface can be placed against the tyre facing surface of the mat shown in FIG. 8A.

FIGS. 8B and 8E show an example where the ridges 40*a-f*, 62*a*-eare oriented differently although still in a reciprocal manner for each front and rear tyre mat 30, 36 relative to the longitudinal axis of the mat bases 50, 70 of the front and rear tyre mats 30, 36. In this embodiment, the chocks and corresponding apertures are slightly off-set laterally from the longitudinal axis of the mat bases. In order to engage four mat bases together, the chuck and apertures are offset to the opposite side of the longitudinal mat axis so that when the other pair of front and rear mat bases are stacked together with their tyre facing surfaces 51, 72 facing each other and then are rotated by 180, the protruding portion of chock 32 from the rear surface 71 of the rear mat 36 of one pair of stacked mats will still be able to engage with the other pair of stacked mats.

FIG. 8C shows a plan view of an embodiment, for example, the embodiment shown in FIG. 4A or 4D, where a chock support 60 region or collar is provided around the chock 32. The provision of chock support 60 will not interfere with the engagement of the front and rear tyre detailing mats 30, 36 if the height of the sides 58 of the chock support 60 does not exceed the maximum height of the ridges 40*a-f* (for example, see FIG. 4B) or ridges 62*a-e*.

FIGS. 9A to 9D show schematic examples of cross-sections of ridges 40, 62 which may be used in various embodiments of the front or rear tyre detailing mats 30, 36.

FIG. 9A shows schematically a front tyre 12*a*, for example, tyre 12*a* as shown in FIG. 2 or FIG. 3A or 4A, resting on ridges 40*a-f* of a front tyre base 50. As shown in FIG. 9A the heights of each ridge are equal. The reciprocal ridge profile of the rear tyre base 70 is now shown, but this would be similar to that shown in FIG. 9A although the positions of the ridges 62 would be so that they pass to the side or between each pair of ridges 40 of the front tyre detailing mat 30. In this way, when a pair of front and rear tyre detailing mats 30, 36 are folded together, the ground facing surfaces of each mat face each other. In some embodiments, by placing the ridged surfaces of pairs of mats, typically first and second mats, for example, front and rear mats, against each other, the ridges of the mats are able to engage or intertwine with each other.

Although the disclosed embodiments refer to monolithic ridges, it will be appreciate that different types and orientations of ridges and/or other forms of protrusions from the tyre facing surfaces of the mats may be used in some embodiments, for example other forms of protrusions may comprise bumps or studs, which may be arranged in the form of ridges in some embodiments.

FIG. 9B shows a different ridge profile in the form of a parallelogram for the ridges 40*a-f* of the front tyre detailing mat 30 and FIG. 9C shows the corresponding ridge profile for the ridges 62*a-e* of the rear tyre detailing mat 30. In this case, the ridges may be formed from a slightly resilient material such as a hard rubber and the parallelogram is greatly exaggerated in the drawings as the side walls 54 of the front tyre detailing mat shown in FIG. 8B, and the slope of the side walls 68 shown in FIG. 9C would need to slope only enough to allow the ridges to flex when pressed together so as help hold the front and rear tyre detailing mats 30, 36 when they are pressed together when engaging their tyre facing surfaces 48 and 71.

FIG. 9D shows yet another example of the way ridges 40 may have a different profile across the width of a tyre detailing mat 30. As shown in FIG. 9D, the ridge side wall heights 54 reduce towards the centre of the mat. The corresponding rear tyre detailing mat may have a ridge profile as shown in FIG. 9A or it may have the same ridge profile as that shown in FIG. 9D. As shown, when the front tyre detailing mats 30 is stacked so that its chock passes through the aperture 38*a* or 38*b* of a rear tyre detailing mat, only the outer ridges, ridges 40*a*, 40*f* for example as shown in FIG. 9D, will come into contact with the surface 71 of the rear tyre detailing mat 36, unless the surface 71 is curved or otherwise shaped to reciprocate the ridge profile shown.

FIG. 10 shows schematically how a set of two pairs of tyre detailing mats, each pair comprising a front tyre detailing mat 30 with a chock 32 and a rear tyre detailing mat 36 are arranged for stacking into a tyre detailing mat assembly 80 (see FIGS. 12*a* and 12*b*) by moving their surfaces 51, 72 towards each other to form two stacked pairs.

FIG. 11 breaks down in more detail FIG. 10 and shows schematically how the two pairs of engaged front and rear tyre detailing mats are moved together to be stacked into a tyre detailing mat assembly according to an embodiment of the disclosed technology. As shown in FIG. 11, each pair of front and rear mats 30, 36 are positioned so their surfaces 48, 71 face each other and aligned so that the chock 32 of the front mat 30 passes through an aperture 38*a* or 38*b* of the rear mat 36 and the other aperture 38*a* or 38*b* of the rear mat 36 is aligned with the aperture 34 of the front mat 30. Each of the two pairs of mats is then orientated so that its chock can engage through the aligned apertures 34, 38*a* or 34, 38*b* of the other pair, as shown in FIG. 12A.

FIG. 12A shows schematically a sideways view the two pairs of front and rear tyre detailing mats stacked together into a tyre detailing mat assembly 80 according to an embodiment of the disclosed technology. The mats 30, 36 shown in FIG. 12A have the same ridge height 54, 68 which enables the surface 48 of the front tyre detailing mat 30 to come into contact with the ridges 62 of the rear tyre detailing mat, and for the surface 71 of the rear tyre detailing mat 36 to come into contact with ridges 40*a-f* of the front tyre detailing mat 30. The chocks 32 of each of the front tyre detailing mats 30 are shown schematically engaging through the apertures of the other three mats (the two rear tyre detailing mats 36 and the other front tyre detailing mat 30).

FIG. 12B shows a perspective view of the tyre detailing mat assembly 80 of FIG. 12A which also shows how a chock 32 of one front tyre detailing mat positioned at one end, as shown the bottom, of the tyre detailing mat assembly 80 has engaged with the two inner rear tyre detailing mats and the front tyre detailing mat at the other end, as shown the top, of the assembly 80.

In some embodiments the front and rear tyre detailing mats 30, 36 are formed from a type of resilient rubber, for example, they may be formed from low-density polyethylene, LDPE, high-density polyethylene, HDPE, polyvinyl chloride, PVC, or any other suitable form of polyethylene, PE in some embodiments.

The mats 30, 36 are retained in the tyre mat assembly 80 in some embodiments where the mats are moulded from a resilient material such as resilient rubber by compressing the chucks slightly so they pass through the apertures 34, 38*a*, 38*b* and are held frictionally in place by at least the sidewalls 42 of aperture 34 and, in some embodiments, also by the sides walls 64*a*, 64*b* of apertures 38*a*, 38*b*. This frictionally holds the stacked front and rear mat pairs in the assembly 80 together to facilitate storage and carriage.

The above embodiments are merely illustrative of preferred embodiments of the claimed invention as for the sake of conciseness is it is not possible to set out all alternatives or combinations or permutations or equivalents of the disclosed features of each possible embodiment of a front or rear tyre detailing mat or the assembly of a plurality of front and rear mat individually or in pairs. It is accordingly intended that the following claims are interpreted to include all alterations, permutations, and equivalents to any individual one or combination of the disclosed embodiments that would fall within the claimed scope of the invention.

The invention claimed is:

1. A tire detailing mat assembly comprising:

a first tire detailing mat comprising:

a mat base having a plurality of ridges formed on a surface of the mat base, the plurality of ridges forming channels or grooves which are directed towards a drainage aperture; and a chock positioned on a surface at one end of the mat base;

a second tire detailing mat comprising:

a mat base having two drainage apertures and having a plurality of ridges formed on a surface of the mat base, wherein the ridges form channels or grooves which are directed towards at least one of the two drainage apertures, and wherein, the second tire detailing mat is configured so that the surface of the base mat is configured to be placed in contact against the plurality of ridges provided on the surface of the first tire detailing mat with the plurality of ridges of the first tire detailing mat laying alongside the plurality of ridges of the second tire detailing mat, one of the two drainage apertures is aligned with the drainage aperture of the first tire detailing mat and-the chock of the first tire detailing mat passing through the other drainage aperture of the second tire detailing mat.

2. A vehicle tire detailing mat kit configured to form a vehicle tire detailing mat assembly, the kit comprising:

a pair of first tire detailing mats as claimed in claim 1; and a pair of second tire detailing mats as claimed in claim 1, wherein the first and second tire detailing mats are configured to be assembled by passing in opposite directions each one of the chocks of each first tire detailing mat through the apertures of the second tire mats and the aperture of the other first tire mat.

3. The vehicle tire detailing mat kit as claimed in claim 2, wherein the vehicle tire detailing mat assembly comprises two pairs of first and second tire detailing mats, each pair comprising a first and a second tire detailing mat with the surfaces on which their respective ridges are provided facing each other, wherein the chocks of each pair are then passed through aligned apertures of the other pair of first and second tire detailing mats.

4. The vehicle tire detailing mat kit as claimed in claim 2, wherein the first and second tire detailing mats are formed from a resilient rubber material, and wherein the dimensions of the chocks and drainage apertures through which the chocks of the first tire detailing mats pass in the vehicle tire detailing mat assembly are configured so that the chocks are laterally compressed within the drainage apertures.

5. The tire detailing mat assembly as claimed in claim 1, wherein in use, the mat base of each of the first tire detailing mat and second detailing mat is placed on a ground surface and the plurality of ridges are configured to support a tire attached to a vehicle off the ground surface.

6. The tire detailing mat assembly according to claim 1, wherein the drainage aperture of the first tire detailing mat is located at an end of the mat base opposite to the chock and is configured to allow the chock to pass through the drainage aperture.

7. The tire detailing mat assembly as claimed in claim 1, wherein the first tire detailing mat further comprises a chock support supporting the chock.

8. The tire detailing mat assembly as claimed in claim 7, wherein the chock support is a raised region or platform on the mat base on top of which the chock is provided.

9. The tire detailing mat assembly as claimed in claim 7, wherein the chock support is a collar which surrounds the chock on the mat base.

10. The tire detailing mat assembly as claimed in claim 1, wherein the plurality of ridges of the first tire detailing mat are arranged to run longitudinally on the mat base from a chock end of the mat base towards the drainage aperture.

11. The tire detailing mat assembly as claimed in claim 1, wherein one or both of the first and second tire detailing mats comprises a resilient material or rubber mat.

12. The tire detailing mat assembly as claimed in claim 11, wherein one or both of the first and second tire detailing mats is a moulded uni-body mat made from a resilient rubber material.

13. The tire detailing mat assembly as claimed in claim 12, wherein the resilient rubber material comprises at least one of: high-density polyethylene (HDPE), low-density polyethylene, or polyvinyl chloride (PVC).

14. A method of detailing tires on a vehicle using a vehicle tire detailing kit as claimed in claim 2, the method comprising:

placing each of the first tire detailing mats adjacent to a front tire of the vehicle;

placing each of the second tire detailing mats adjacent to a rear tire of the vehicle; and moving the vehicle forwards or backwards onto the first tire detailing mats until the front tires are placed on the first tire detailing mats adjacent the chocks of the first tire detailing mats and the rear tires of the vehicle are positioned on the second tire detailing mats.

* * * * *